(12) United States Patent
Murphy et al.

(10) Patent No.: US 7,784,874 B2
(45) Date of Patent: Aug. 31, 2010

(54) ENERGY ABSORBING SEAT ANCHOR RESTRAINT SYSTEM FOR CHILD SAFETY SEATS

(75) Inventors: Mark Murphy, Livonia, MI (US); Reddy Malapati, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 11/608,729

(22) Filed: Dec. 8, 2006

(65) Prior Publication Data

US 2008/0136225 A1 Jun. 12, 2008

(51) Int. Cl.
*A62B 35/00* (2006.01)

(52) U.S. Cl. .................. 297/472; 297/471; 297/253

(58) Field of Classification Search .................. 297/471, 297/472, 253
See application file for complete search history.

(56) References Cited

U.S. PATENT DOCUMENTS

| | | | |
|---|---|---|---|
| 3,087,584 A * | 4/1963 | Jackson et al. .............. 188/372 |
| 3,198,288 A | 8/1965 | Presunka | |
| 3,547,468 A | 12/1970 | Giuffrida | |
| 4,027,905 A * | 6/1977 | Shimogawa et al. ........ 297/472 |
| 4,099,770 A * | 7/1978 | Elsholz et al. ......... 297/216.11 |
| 4,358,136 A | 11/1982 | Tsuge et al. | |
| 5,487,562 A * | 1/1996 | Hedderly et al. ............. 280/777 |
| 5,639,144 A | 6/1997 | Naujokas | |
| 6,039,353 A * | 3/2000 | Bauer et al. ................. 280/806 |
| 6,485,055 B1 | 11/2002 | Swayne et al. | |
| 6,517,154 B2 * | 2/2003 | Sawamoto ............. 297/216.11 |
| 6,767,057 B2 | 7/2004 | Neelis | |
| 6,769,715 B2 * | 8/2004 | Riefe et al. .................. 280/777 |
| 6,918,464 B2 * | 7/2005 | Renton et al. .................. 182/18 |
| 7,021,709 B2 * | 4/2006 | Dolan et al. ................. 297/253 |
| 7,188,704 B2 * | 3/2007 | Renton et al. .................. 182/18 |
| 2004/0095004 A1 | 5/2004 | Horton et al. | |
| 2005/0217608 A1 | 10/2005 | Johnson et al. | |
| 2006/0049622 A1 | 3/2006 | Yamamoto | |

FOREIGN PATENT DOCUMENTS

| | | |
|---|---|---|
| DE | 2637406 | 3/1977 |
| WO | 01/46601 | 6/2001 |
| WO | 2005/058635 | 6/2005 |

* cited by examiner

*Primary Examiner*—Laurie K Cranmer
(74) *Attorney, Agent, or Firm*—Fredrick Vernon Owens; Alleman Hall McCoy Russell & Tuttle LLP

(57) ABSTRACT

A child safety seat tether anchor for securing a child safety seat to a mounting portion of a vehicle is provided. The child safety seat tether anchor may comprise a metal strip cooperating with a plurality of vertically offset pins extending from a surface of an engagement structure and positioned along a length of the metal strip. The metal strip is bent by the plurality of pins along a length of the metal strip so that when pulled in tension, the metal strip slides while bending around the pins to absorb energy.

13 Claims, 5 Drawing Sheets

ENERGY ABSORBING SEAT ANCHOR RESTRAINT SYSTEM FOR CHILD SAFETY SEATS

FIELD OF INVENTION

The present application relates to an energy absorbing seat anchor restraint system for child seats.

BACKGROUND

To meet Federal Motor Vehicle Safety Standards, a vehicle may include an upper anchor attachment to receive a child safety seat tether hook connected to an upper portion of the child safety seat back. The connection of the upper portion of the child safety seat to the vehicle may reduce the forward movement of the child safety seat during a frontal crash. However, shock applied by the child safety seat restraining equipment to the child safety seat occupant may increase in the case of a forward vehicle collision.

One approach to reduce the impact of the collision force to a passenger seat is described in U.S. Pat. No. 3,547,468. In particular, the energy absorbing device includes a generally U-shaped housing having two pins and one bolt extending between the sidewalls of the housing. A double layer of strip metal is coiled to form a supply of strip metal. From the coil, two layers of metal strips are spread by the bolt and then are threaded through two pins. When the strip metal is pulled under a force, the coil is uncoiled and portions of the strip metal are spread apart by a bolt and then are pinched toward one another by the two pins. The bending of the strip portions by the pins and bolt absorbs energy.

However, the inventors herein have recognized disadvantages with such an energy absorbing device. Specifically, since the width and the thickness of the strip metal are constant, the load applied to the child safety seat may be constant as the double layered strips spread around the bolt and are pinched by the two pins, which may not be desired in some situations. Further, the energy absorbing device is heavy and complicated because the device comprises a strip coil, the double layered metal strips, and other components.

SUMMARY OF THE INVENTION

According to one aspect, the above issues may be addressed by a child safety seat tether anchor for securing a child safety seat to a mounting portion of a vehicle. The child safety seat tether anchor comprises an elongate metal strip including a first end having a seat-side connection portion configured to be coupled with the child safety seat, and a second end having a travel limiting structure; an engagement structure having a surface where the engagement structure is configured to be fixed to the mounting portion of the vehicle; and a plurality of pins extending from the surface of the engagement structure and positioned along a length of the metal strip; wherein the metal strip is bent by the plurality of pins along a length of the metal strip, and is configured, when the first end is pulled in tension, to slide while bending around the pins between a retracted configuration and an extended configuration, thereby absorbing energy; wherein the metal strip is inhibited from moving when a force applied to the tether anchor is below a predetermined level and the metal strip travels through the plurality of pins when the force is above the predetermined level; and wherein extension of the metal strip is constrained by the travel limiting structure.

According to another aspect, a child safety seat tether anchor for securing a child safety seat to a mounting portion of a vehicle is provided. The child safety seat tether anchor comprises an elongate metal strip including a first end having a tether coupling portion configured to be coupled with the child safety seat, a second end having a travel limiting structure, and a rear portion having a varied dimension; an engagement structure having a surface where the engagement structure is configured to be fixed to the mounting portion of the vehicle; and a plurality of pins substantially perpendicular to the surface of the engagement structure and positioned along a length of the metal strip wherein the metal strip is bent by the plurality of pins along a length of the metal strip, and is configured, when the first end is pulled in tension, to slide while bending around the pins between a retracted configuration and an extended configuration, thereby absorbing energy, wherein the amount of energy absorbed is varied as the rear end portion having a varied dimension is pulled through the plurality of pins; wherein the plurality of pins includes two sandwich pins that are configured to sandwich the metal strip by contacting the metal strip on opposite sides of the metal strip adjacent the second end; wherein further extension of the metal strip is inhibited when the travel limiting structure contacts the two sandwich pins in the extended configuration.

According to yet another aspect, a child safety seat tether anchor for securing a child safety seat to a mounting portion of a vehicle is provided. The child safety seat tether anchor comprises an engagement structure having a surface where the engagement structure is configured to be fixed to the mounting portion of the vehicle; elongate metal strip means for coupling the child safety seat to the engagement structure and for absorbing energy; pin means for bending the elongate metal strip, such that energy is absorbed as the elongate metal strip is pulled in tension through the pins between a retracted configuration and an extended configuration.

DETAILED DESCRIPTION OF THE PREFERRED EMBODIMENTS

Figure 1:
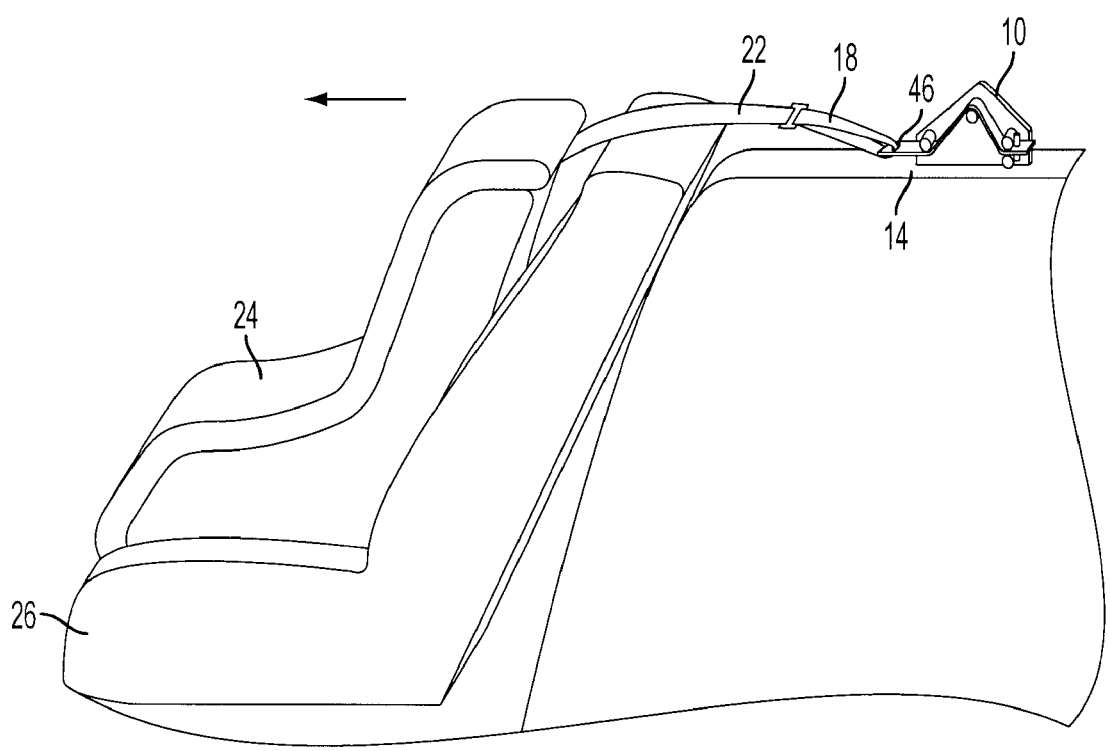
FIG. 1 is a perspective view of an exemplary embodiment of a child safety seat tether anchor for securing a child safety seat to a vehicle, schematically illustrating a coupling of the child safety seat tether anchor to a tether of the child safety seat.

FIG. 1 shows an exemplary child safety seat tether anchor 10 used in an upper anchorage of a child safety seat restraint system of a vehicle having a passenger seat 26 and a child safety seat 24. Child safety seat tether anchor 10 is secured to a mounting portion 14 of the vehicle. In the depicted embodiment, mounting portion 14 is located on a package tray of the vehicle. However, it should be appreciated that the mounting portion could be located in other locations on the vehicle, as described below. A tether coupling portion 46 of child safety seat tether anchor 10 is coupled to a latchable portion 18 of an upper tether 22 of child safety seat 24. Child safety seat tether anchor 10 and tether 22 form the upper anchorage of the child safety seat restraint system.

Figure 2A:
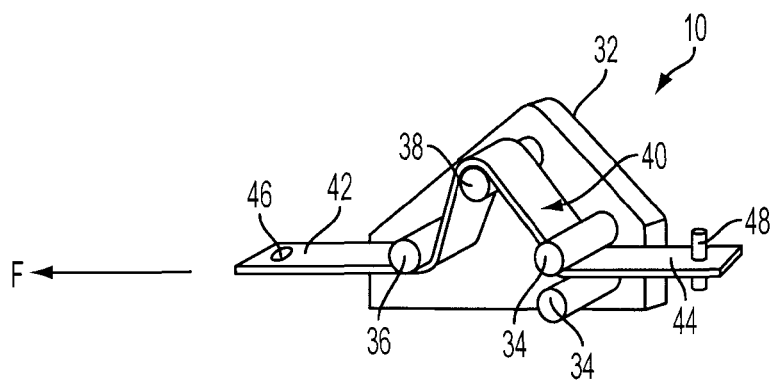
FIG. 2A is a perspective view of a first exemplary embodiment of a child safety seat tether anchor, schematically illustrating the child safety seat tether anchor in a retracted configuration.
Figure 2B:
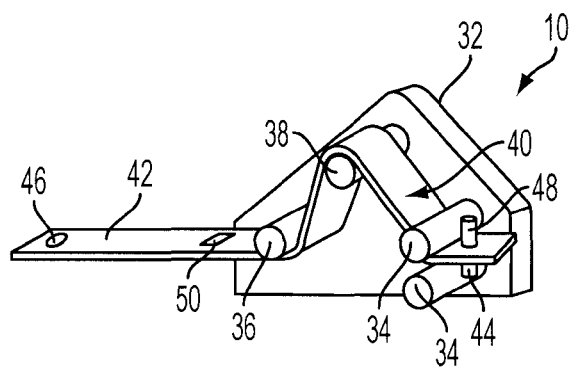
FIG. 2B is a perspective view of the first exemplary embodiment of the child safety seat tether anchor shown in FIG. 2A, schematically illustrating the child safety seat tether anchor in an extended configuration.

FIG. 2 is a perspective view of a first exemplary embodiment of a child safety seat tether anchor 10 for securing a child safety seat to a mounting portion of a vehicle. FIG. 2A schematically illustrates the child safety seat tether anchor in a retracted configuration and FIG. 2B schematically illustrates the child safety seat tether anchor in an extended configuration. Typically, tether anchor 10 includes an engagement structure 32, a plurality of pins 34, 36, 38 extending from a surface of engagement structure 32, and an elongate metal strip 40 bent by the plurality of pins. Engagement structure 32 is configured to support the plurality of pins and to be coupled to the mounting portion of the vehicle. In some embodiments, engagement structure 32 may include a substantially planar surface from which pins 34, 36, 38 extend perpendicularly. Engagement structure 32 may be coupled to the mounting portion by any suitable mechanism such as a weld, a fastener such as a rivet, bolt, or screw, or via a bracket.

Metal strip 40 may include a front end 42 and a rear end 44. In some embodiments, front end 42 may include a tether coupling portion 46 configured to be coupled with a tether of the child safety seat. In the depicted embodiment, tether coupling portion 46 includes an opening to be coupled with a latchable portion of the tether. In some embodiments, rear end 44 may include a travel limiting structure 48. In the depicted embodiment, travel limiting structure 48 includes a stopper pin. It should be appreciated that travel limiting structure 48 may have various configurations as described below.

Continuing with FIG. 2, in the depicted embodiment, the plurality of pins includes two sandwich pins 34 configured to sandwich metal strip 40 by contacting metal strip 40 on opposite sides of the metal strip adjacent to rear end 44. Tether anchor 10 may further include a low pin 36 and a high pin 38. In the depicted embodiment, metal strip 40 is alternatively positioned under low pin 36 and over high pin 38. It should be appreciated that variations to the location and configuration of pins are possible. For example, the location of the pins on engagement structure 32 may be varied. In one example, pin 38 may be positioned in a place lower than pin 36. In another example, distances between pins may be varied. Further, the number of pins included in tether anchor 10 may be varied. For example, tether anchor 10 may include more or less than four pins. Furthermore, while a cross-section of pins 34, 36, and 38 is circular in the depicted embodiment, the cross section of pins may be of any suitable shape such as elliptical, polygonal, etc.

In some embodiments, metal strip 40 may include a warning indicator 50 indicating the need for replacement of the attachment assembly. Warning indicator 50 may be positioned such that it is hidden in a retracted configuration, and it is visible to a user when the metal strap is in an extended configuration as shown in FIG. 2B. The warning indicator, for example, includes a section of color or other indicia placed on the surface of the metal strip.

The tether anchor 10 described above allows metal strip 40 to travel and deform in response to a force applied to it as metal strip 40 transitions from the retracted configuration as shown in FIG. 2A to an extended configuration as shown in FIG. 2B where travel limiting structure 48 contacts sandwich pins 34. During normal vehicle drive, metal strip 40 is secured by sandwich pins 34 to resist movement of the child safety seat so that metal strip 40 is maintained in the retracted configuration. During a collision event, the inertia of the child safety seat system generates a forward force applied to tether anchor 10 as indicated by an arrow. When the force is below a predetermined level, such as during panic braking, energy absorbing anchor 10 may be maintained in the retracted configuration so that the child safety seat is prevented from moving. However, as the force exceeds a predetermined level, metal strip 40 may slide while bending around the pins. The extension of metal strip 40 in the direction of the force may be constrained by travel limiting structure 48. As metal strip 40 travels between the retracted configuration and the extended configuration, metal strip 40 is deformed, thereby absorbing energy.

The child safety seat tether anchor described above has various advantages. For example, because deformation of the metal strip can be controlled by pins positioned along the length of the metal strip and the extent of fastening capability of the sandwich pins, desired load applied to the child safety seat can be achieved. Further, the child safety seat tether anchor has a simple and light structure.

Figure 3A:
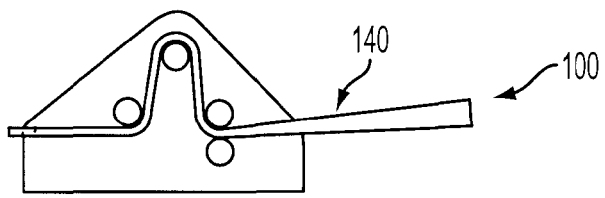
FIG. 3A is a side view of a second exemplary embodiment of a child safety seat tether anchor.
Figure 3B:
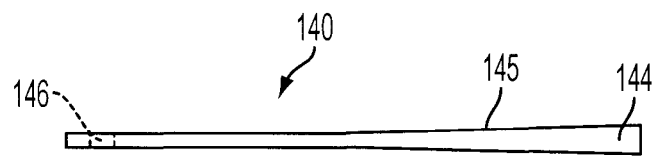
FIG. 3B is a side view of a metal strip included in the child safety seat tether anchor shown in FIG. 3A.
Figure 3C:
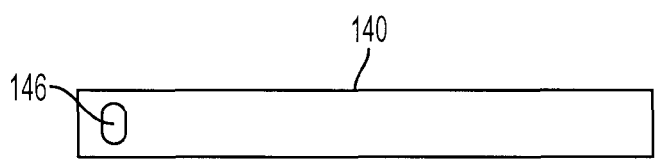
FIG. 3C is a plan view of a metal strip included in the child safety seat tether anchor shown in FIG. 3A.

FIG. 3 shows a second exemplary embodiment of a child safety seat tether anchor 100. In each of the embodiments, similar reference characters refer to similar parts which will not be re-described in detail. FIGS. 3A and 3B show that a metal strip 140 has varied thickness along its length. In the depicted embodiment, thickness of metal strip 140 increases gradually toward rear portion 145. FIG. 3C shows that metal strip 140 has a constant width. It should be noted that metal strip 140 may have varied width as desired.

In addition to advantages described above, this configuration allows the load applied to the anchor to ramp up, thereby increasing energy absorption. Further, the increased thickness at the rear end can be employed to constrain the travel of metal strip 140 under tension. Thus, a separate travel limiting structure may be eliminated. Further, since metal strip 140 gradually stops at an extended configuration under the tension, an abrupt impact on an occupant of the child safety seat can be avoided.

Figure 4A:
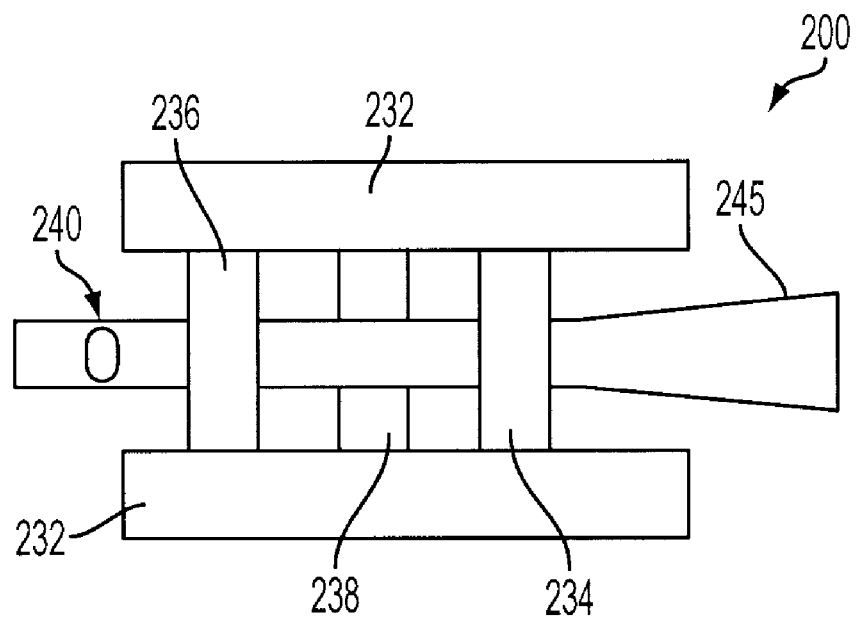
FIG. 4A is a plan view of a third exemplary embodiment of a child safety seat tether anchor.
Figure 4B:
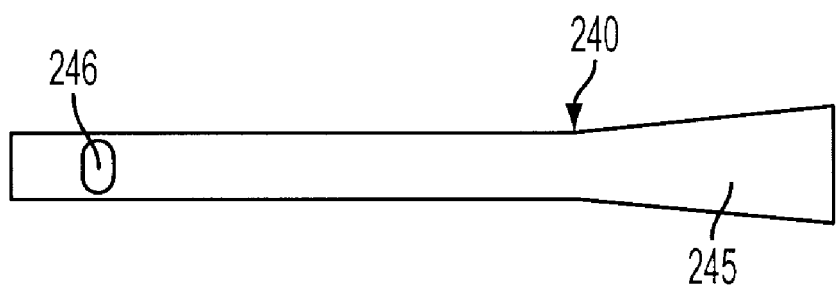
FIG. 4B is a plan view of a metal strip included in the child safety seat tether anchor shown in FIG. 4A.
Figure 4C:
FIG. 4C is a side view of a metal strip included in the child safety seat tether anchor shown in FIG. 4A.

FIGS. 4A-4C show a third exemplary embodiment of a child safety seat tether anchor 200. FIG. 4A and FIG. 4B illustrate metal strip 240 with a varied width. In the depicted embodiment, the width of metal strip 240 increases at a rear portion 245 toward a rear end 244. FIG. 4C shows that metal strip 240 has a constant thickness. Again, it should be noted that metal strip 240 may have varied thickness as desired.

The energy absorbing anchor having a metal strip with varied width has similar advantages to the energy absorbing anchor having a metal strip with varied thickness as described above. Further, the manufacturing of metal strip with varied width and constant thickness may be simple in some situations.

Figure 5A:
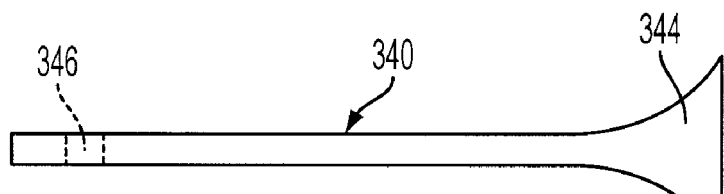
FIG. 5A is a side view of a forth exemplary embodiment of a metal strip in a child safety seat tether anchor.
Figure 5B:
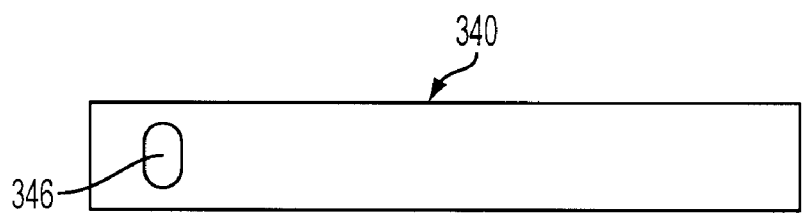
FIG. 5B is a plan view of a forth exemplary embodiment of the metal strip in a child safety seat tether anchor shown in FIG. 5A.

FIG. 5 shows a forth exemplary embodiment of a metal strip 340 in a child safety seat tether anchor. A side view of metal strip 340 as shown in FIG. 5A shows that metal strip 340 includes a curved rear end 344. In the depicted embodiment, rear end 344 includes a flare that may be employed as a travel limiting structure. A plan view of metal strip 340 in FIG. 5B shows that metal strip 340 has constant width.

Figure 6A:
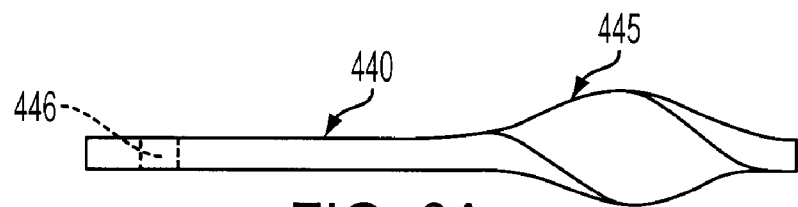
FIG. 6A is a side view of a fifth exemplary embodiment of a metal strip in a child safety seat tether anchor.
Figure 6B:
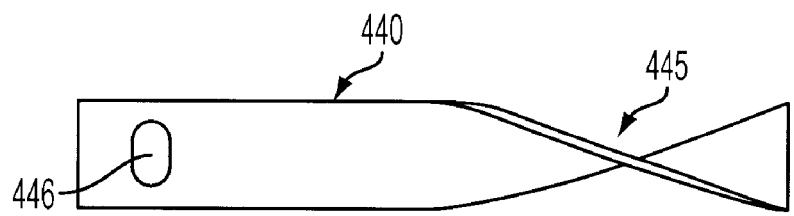
FIG. 6B is a plan view of a fifth exemplary embodiment of the metal strip in a child safety seat tether anchor shown in FIG. 6A.
Figure 6C:
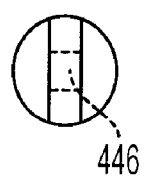
FIG. 6C is a front view of a fifth exemplary embodiment of the metal strip in a child safety seat tether anchor shown in FIG. 6A.

FIG. 6 shows a fifth exemplary embodiment of a metal strip 440 in a child safety seat tether anchor. A side view in FIG. 6A, a plan view in FIG. 6B, and a front view in FIG. 6C of metal strip 440 show that the metal strip has a twisted rear portion 445. In some embodiments, twisted rear portion 445 may be employed as a travel limiting structure.

In addition to advantages described above, the metal strip with a twisted end may absorb extra energy as it is flattened and pulled through sandwich pins.

It should be appreciated that the above embodiments are illustrated for exemplary purposes. Other suitable combinations of features are possible. For example, a metal strip may include both varied width and a flared end, etc.

While the metal strip used in the above embodiments has been described as being metal, it will be appreciated that other suitable materials may be used that absorb energy when deformed in the manner described above.

Figure 7:
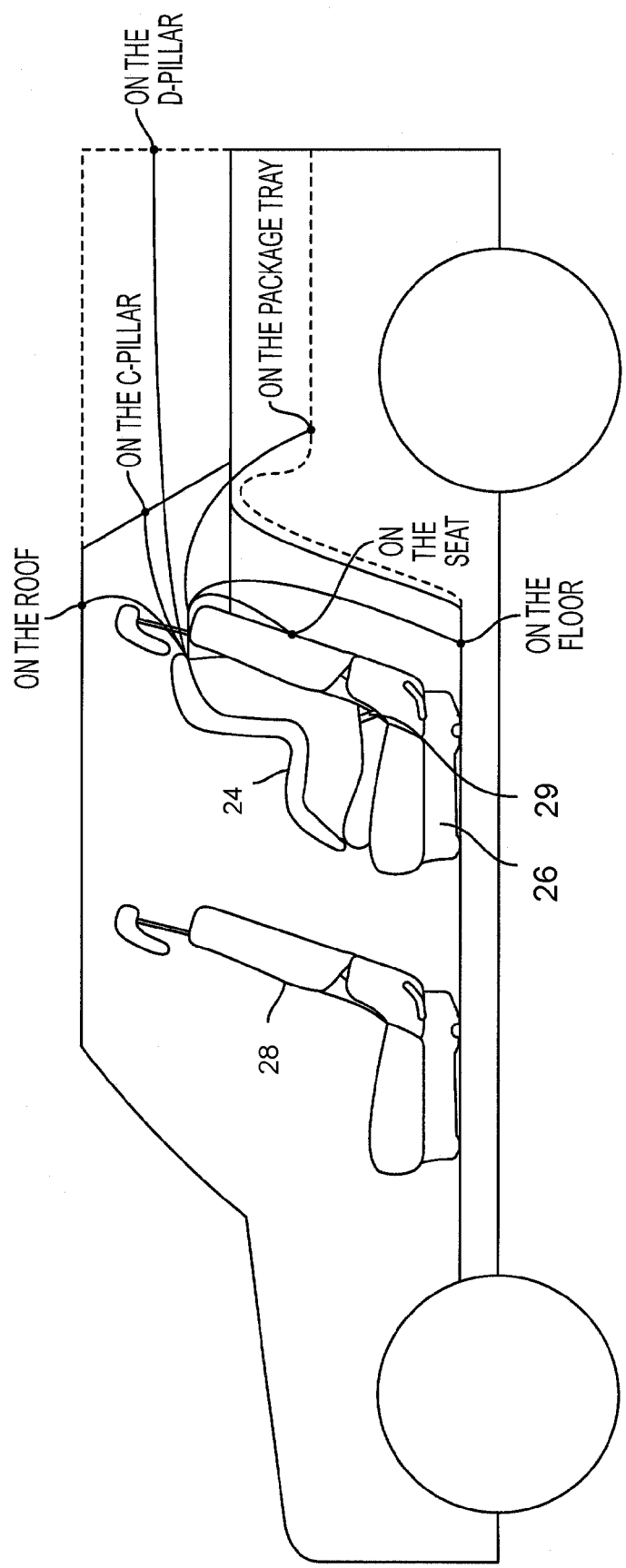
FIG. 7 is a cross-sectional view of a vehicle, schematically illustrating mounting portions in the vehicle to secure a child safety seat tether anchor which forms an upper anchorage and lower anchorage for a child safety seat.

FIG. 7 is a cross-sectional view of a vehicle having a child safety seat 24, passenger seat 26 and driver seat 28, schematically illustrating mounting portions of a vehicle chassis to which a child safety seat tether anchor may be secured when used as an upper anchorage or a lower anchorage for child safety seat 24. The child safety seat tether anchor may be used in an upper anchorage for an upper tether of the child safety seat. The upper anchorage may be mounted at various portions of the vehicle. As shown in FIG. 7, the child safety seat tether anchor for the upper anchorage may be mounted on the package tray, roof, seat, floor, or C-pillar of a sedan type vehicle. The child safety seat tether anchor for the upper anchorage may be further mounted on the D-pillar of a wagon as indicated by the vertical dashed line in FIG. 7.

Further, it will be appreciated that child safety seat tether anchor may also be used as a lower anchorage. For example, child safety seat tether anchor may be coupled to a lower end of child safety seat 24 and the mounting portion may be positioned in a bight 29, thereby forming a lower anchorage.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various structures, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of methods and system component configurations, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A child safety seat tether anchor for securing a child safety seat to a mounting portion of a vehicle, the child safety seat tether anchor comprising:
    an elongate metal strip having flat surfaces along an entire length of the metal strip without a coil at end portions and including a first end having a tether coupling portion configured to be coupled with the child safety seat, and a second end having a travel limiting structure;
    an engagement structure having a surface where the engagement structure is configured to be fixed to the mounting portion of the vehicle; and
    a plurality of pins extending from the surface of the engagement structure and positioned along the length of the metal strip and along the engagement structure, wherein the plurality of pins includes a low pin positioned at one end of the engagement structure adjacent to the first end of the metal strip, two sandwich pins positioned at an opposite end of the engagement structure adjacent to the second end of the metal strip, and a high pin positioned between the low pin and the two sandwich pins such that a distance between the high pin and the low pin is greater than a sum of a diameter of the high pin and a diameter of the low pin, the engagement structure forming a body of the child safety seat anchor, the body terminating at each of opposite ends adjacent the corresponding low pin and sandwich pins;
    wherein the metal strip is bent by the plurality of pins along the length of the metal strip, and is configured, when the first end is pulled in tension, to slide while bending around the pins between a retracted configuration and an extended configuration, thereby absorbing energy by deformation of the metal strip around the pins wherein the deformation is controlled primarily by pins positioned along the length of the metal strip;
    wherein the metal strip is inhibited from moving when a force applied to the tether anchor is below a predetermined level and the metal strip travels through the plurality of pins when the force is above the predetermined level; and
    wherein extension of the metal strip is constrained by the travel limiting structure.

2. The child safety seat tether anchor of claim 1, wherein the two sandwich pins are configured to sandwich the metal strip by contacting the metal strip and positioned vertically relative to a side of the engagement structure fixed to the mounting portion.

3. The child safety seat tether anchor of claim 2, wherein the travel limiting structure is configured to contact the two sandwich pins to inhibit further extension of the metal strip in the extended configuration.

4. The child safety seat tether anchor of claim 2, wherein the travel limiting structure includes a stopper pin mounted on the metal strip adjacent the second end, wherein further extension of the metal strip is inhibited when the stopper pin contacts the two sandwich pins in the extended configuration.

5. The child safety seat tether anchor of claim 2, wherein the high pin, the low pin, and the two sandwich pins are positioned in such a way that two end portions of the metal strip slide linearly along a common axis while bending around the pins between the retracted configuration and the extended configuration.

6. The child safety seat tether anchor of claim 1, wherein the metal strip is alternately positioned under the low pin and over the high pin.

7. The child safety seat tether anchor of claim 1, wherein a width of the metal strip is constant along the length of the metal strip.

8. The child safety seat tether anchor of claim 1, wherein a thickness of the metal strip is constant along the length of the metal strip.

9. The child safety seat tether anchor of claim 1, wherein the child safety seat tether anchor further includes a warning indicator positioned on the metal strip indicating a need for replacement of the child safety seat tether anchor, the warning indicator being positioned such that it is hidden when the metal strip is in the retracted configuration, and such that it is visible to a user when the metal strip is in the extended configuration.

10. The child safety seat tether anchor of claim 9, wherein the vehicle mounting portion is selected from a group consisting of location on a C-pillar, a D-pillar, a roof, a package tray, a seat, a seat frame, and a floor of the vehicle.

11. The child safety seat tether anchor of claim 1, wherein the first end is coupled to an upper end of the child safety seat, to thereby form an upper anchorage.

12. The child safety seat tether anchor of claim 1, wherein the child safety seat tether anchor is coupled to a lower end of the child safety seat and the vehicle mounting portion is positioned in a bight of a seat of the vehicle, thereby forming a lower anchorage.

13. A child safety seat tether anchor for securing a child safety seat to a mounting portion of a vehicle, the child safety seat tether anchor comprising:
  an elongate metal strip having flat surfaces along an entire length of the metal strip without a coil and including a front end having a tether coupling portion configured to be coupled with the child safety seat, and a rear end having a travel limiting structure;
  an engagement structure having a surface where the engagement structure is configured to be fixed to the mounting portion of the vehicle; and
  a plurality of pins extending from the surface of the engagement structure and positioned along the length of the metal strip and along the engagement structure where the plurality of pins includes two sandwich pins that are positioned at a second end of the engagement structure, and are adjacent to the rear end of the metal strip and are configured to sandwich the metal strip by contacting the metal strip, a low pin that is positioned at a first end of the engagement structure and is adjacent to the front end of the metal strip, and a high pin that is positioned between the low pin and the two sandwich pins and positioned vertically relative to a side of the engagement structure fixed to the mounting portion, such that the metal strip forms at least three bends around the pins while bending by the plurality of pins and a distance between the high pin and the low pin is greater than a sum of a diameter of the high pin and a diameter of the low pin, the engagement structure forming a body of the child safety seat tether anchor, the body terminating at each of opposite ends adjacent the corresponding low pin and sandwich pins;
  wherein the metal strip is bent by the plurality of pins along the length of the metal strip, and is configured, when the front end is pulled in tension, to slide while bending around the pins between a retracted configuration and an extended configuration, thereby absorbing energy by deformation of the metal strip wherein the deformation is controlled by pins positioned along the length of the metal strip and an extent of fastening capability of the sandwich pins;
  wherein the metal strip is inhibited from moving when a force applied to the tether anchor is below a predetermined level and the metal strip travels through the plurality of pins when the force is above the predetermined level; and
  wherein extension of the metal strip is constrained by the travel limiting structure.

* * * * *